(12) United States Patent
Ohashi

(10) Patent No.: US 9,418,161 B2
(45) Date of Patent: Aug. 16, 2016

(54) INFORMATION PROCESSING DEVICE, INFORMATION PROCESSING METHOD AND PROGRAM

(75) Inventor: Yoshinori Ohashi, Tokyo (JP)

(73) Assignee: Sony Corporation (JP)

( * ) Notice: Subject to any disclaimer, the term of this patent is extended or adjusted under 35 U.S.C. 154(b) by 167 days.

(21) Appl. No.: 14/236,363

(22) PCT Filed: Jul. 4, 2012

(86) PCT No.: PCT/JP2012/004333
§ 371 (c)(1),
(2), (4) Date: Jan. 31, 2014

(87) PCT Pub. No.: WO2013/021544
PCT Pub. Date: Feb. 14, 2013

(65) Prior Publication Data
US 2014/0164423 A1    Jun. 12, 2014

(30) Foreign Application Priority Data
Aug. 9, 2011 (JP) .................................. 2011-173930

(51) Int. Cl.
G06F 7/00       (2006.01)
G06F 17/30      (2006.01)
G06F 3/0481     (2013.01)

(52) U.S. Cl.
CPC ........ *G06F 17/30867* (2013.01); *G06F 3/0481* (2013.01)

(58) Field of Classification Search
CPC .................... G06F 2203/04803; G06F 3/0481; H04N 21/4316; H04H 60/73; G06Q 30/0269
USPC ........................................................ 707/766
See application file for complete search history.

(56) References Cited

U.S. PATENT DOCUMENTS

| | | | | |
|---|---|---|---|---|
| 2004/0151358 | A1* | 8/2004 | Yanagita | G06T 7/0012 382/132 |
| 2007/0074245 | A1* | 3/2007 | Nyako | H04N 5/44543 725/34 |
| 2007/0112500 | A1* | 5/2007 | Ogawa | B60K 6/48 701/96 |
| 2007/0183381 | A1 | 8/2007 | Seo et al. | |
| 2007/0201502 | A1* | 8/2007 | Abramson | H04L 67/32 370/429 |
| 2008/0077863 | A1 | 3/2008 | Jong et al. | |
| 2008/0295026 | A1* | 11/2008 | Lee | H04N 5/44513 715/810 |
| 2009/0037101 | A1* | 2/2009 | Koike | G01C 21/3664 701/533 |
| 2009/0144663 | A1 | 6/2009 | Shigenobu | |

(Continued)

FOREIGN PATENT DOCUMENTS

| | | |
|---|---|---|
| CN | 101325777 A | 12/2008 |
| CN | 101788904 A | 7/2010 |

(Continued)

OTHER PUBLICATIONS

Chinese Office Action for Application No. 201280038119.7 dated Apr. 5, 2016.

*Primary Examiner* — Binh V Ho
(74) *Attorney, Agent, or Firm* — Lerner, David, Littenberg, Krumholz & Mentlik, LLP

(57) ABSTRACT

An information processing device may include a control unit to control movement of an image related to content within a predetermined area of a display, and a display format of the image based on at least one of a category of the content to which the image is related or meta-information corresponding to the content to which the image is related.

16 Claims, 13 Drawing Sheets

(56) References Cited

U.S. PATENT DOCUMENTS

| | | | | |
|---|---|---|---|---|
| 2009/0150772 A1* | 6/2009 | Noda | ............... | G06F 3/0481 715/277 |
| 2009/0158202 A1* | 6/2009 | Matsuda | ............... | G06F 17/24 715/781 |
| 2011/0010248 A1* | 1/2011 | Nagasaka | ............... | G06Q 30/02 705/14.66 |
| 2011/0032359 A1* | 2/2011 | Tamura | ............... | G01C 21/26 348/148 |
| 2011/0106878 A1* | 5/2011 | Cho | ............... | G06Q 30/02 709/203 |
| 2011/0211802 A1* | 9/2011 | Kamada | ............... | G11B 27/034 386/201 |
| 2012/0150592 A1* | 6/2012 | Govrik | ............... | G06Q 30/0207 705/14.1 |

FOREIGN PATENT DOCUMENTS

| | | |
|---|---|---|
| EP | 1577746 A2 | 9/2005 |
| JP | 2000-222090 A | 8/2000 |
| JP | 2010-231677 A | 10/2010 |

* cited by examiner

[Fig. 10]

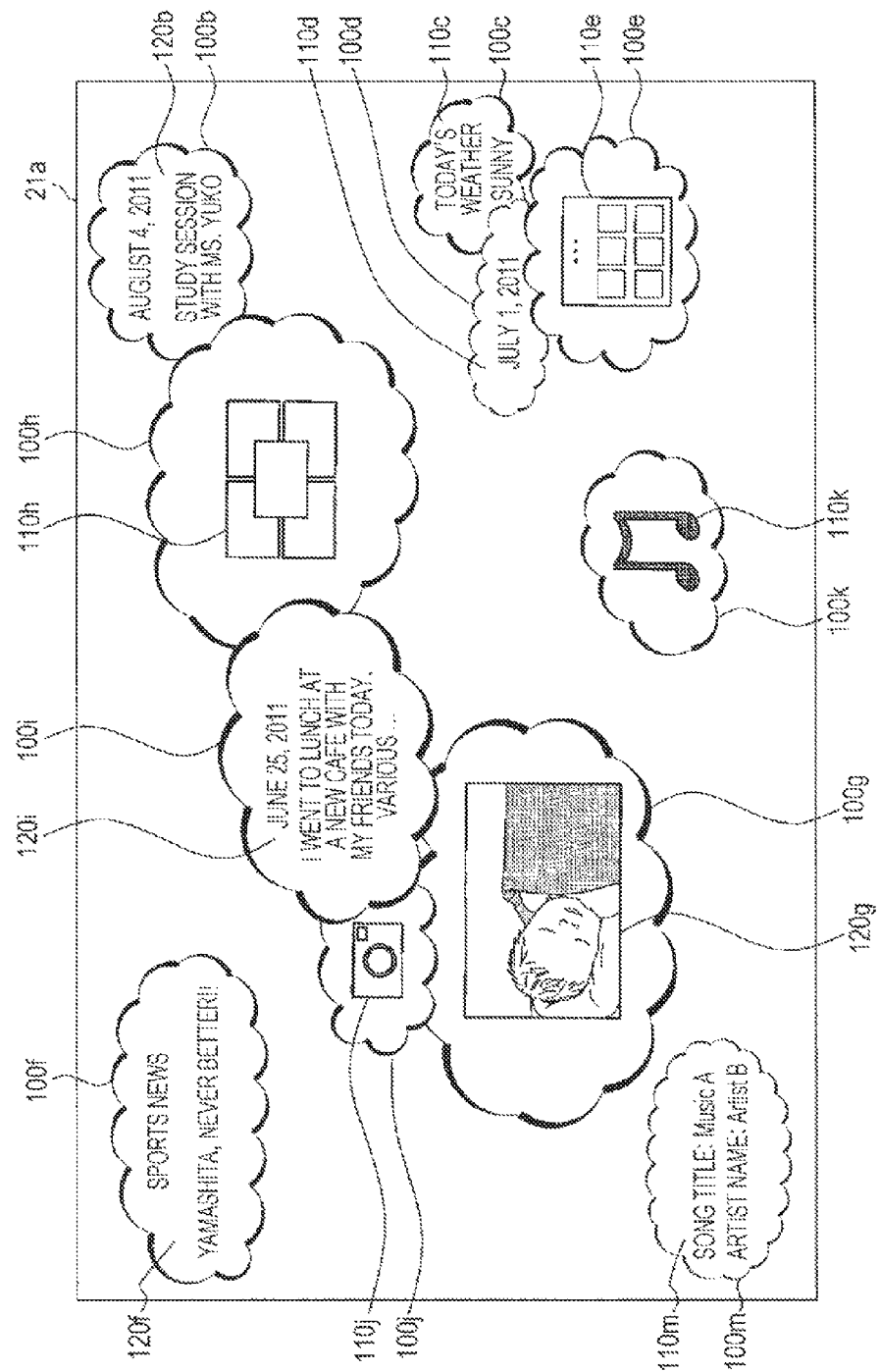

INFORMATION PROCESSING DEVICE, INFORMATION PROCESSING METHOD AND PROGRAM

CROSS-REFERENCE TO RELATED APPLICATIONS

The present application is a national phase entry under 35 U.S.C. §371 of International Application No. PCT/JP2012/004333 filed Jul. 4, 2012, published on Feb. 14, 2013 as WO 2013/021544 A1, which claims priority from Japanese Patent Application No. JP 2011-173930 filed in the Japanese Patent Office on Aug. 9, 2011, the entire contents of which is hereby incorporated by reference.

TECHNICAL FIELD

The present disclosure relates to an information processing device, an information processing method and a program.

BACKGROUND ART

Various types of content exist on a communication network such as the Internet. When utilizing content on the communication network, a user actively searches for the content by using a web browser and the like.

CITATION LIST

Patent Literature

[PTL 1]
JP2000-222090A

SUMMARY

Technical Problem

However, in order to conduct a search effectively, a user is required to have search skills such as choosing a good keyword and knowledge of each web site. For this reason, it is troublesome for a user to search for content on the communication network.

Japanese Patent Application Laid-Open No. 2000-222090 discloses a technique concerned with a graphical user interface, i.e. the so-called GUI. According to the technique, an icon moves within a display area, and when a user selects an icon, processing depending on the selected icon is executed. However, this technique merely moves the icon within the display area, which does not save the user trouble at all. Therefore, a technique with which a user can easily search for content on a communication network has been desired.

Solution to Problem

According to the present disclosure, an information processing device is provided. The information processing device has: a content acquisition unit configured to acquire content through a communication network; and a control unit configured to perform control of moving a content display image regarding the content within a display area on which display of the content display image is allowed.

According to the present disclosure, an information processing method is provided. The information processing method includes: acquiring content through a communication network; and performing control of moving a content display image regarding the content within a display area on which display of the content display image is allowed.

According to the present disclosure, a program is provided. The program causes a computer to perform: a content acquisition function that acquires content through a communication network; and a control function that performs control of moving a content display image regarding the content within a display area on which display of the content display image is allowed.

According to the present disclosure, it is possible to move a content display image regarding content within a display area.

In accordance with one embodiment, an information processing device may include a control unit to control movement of an image related to content within a predetermined area of a display, and a display format of the image based on at least one of a category of the content to which the image is related or meta-information corresponding to the content to which the image is related.

In accordance with another embodiment, an information processing method may include controlling, by a processor, movement of an image related to content within a predetermined area of a display, and a display format of the image based on at least one of a category of the content to which the image is related or meta-information corresponding to the content to which the image is related.

In accordance with another embodiment, a non-transitory storage medium may be recorded with a program executable by a computer, where the program includes controlling movement of an image related to content within a predetermined area of a display, and a display format of the image based on at least one of a category of the content to which the image is related or meta-information corresponding to the content to which the image is related.

Advantageous Effects of Invention

According to the present disclosure, as described above, it is possible to move the content display image within the display area. As a result, a user can conduct a search of content by searching content display images for a desired content display image. Therefore, the user can easily search for content on a network.

BRIEF DESCRIPTION OF DRAWINGS

FIG. 14 is an illustration diagram of an example of an image displayed by the communication device.

DESCRIPTION OF EMBODIMENTS

Figure 1:
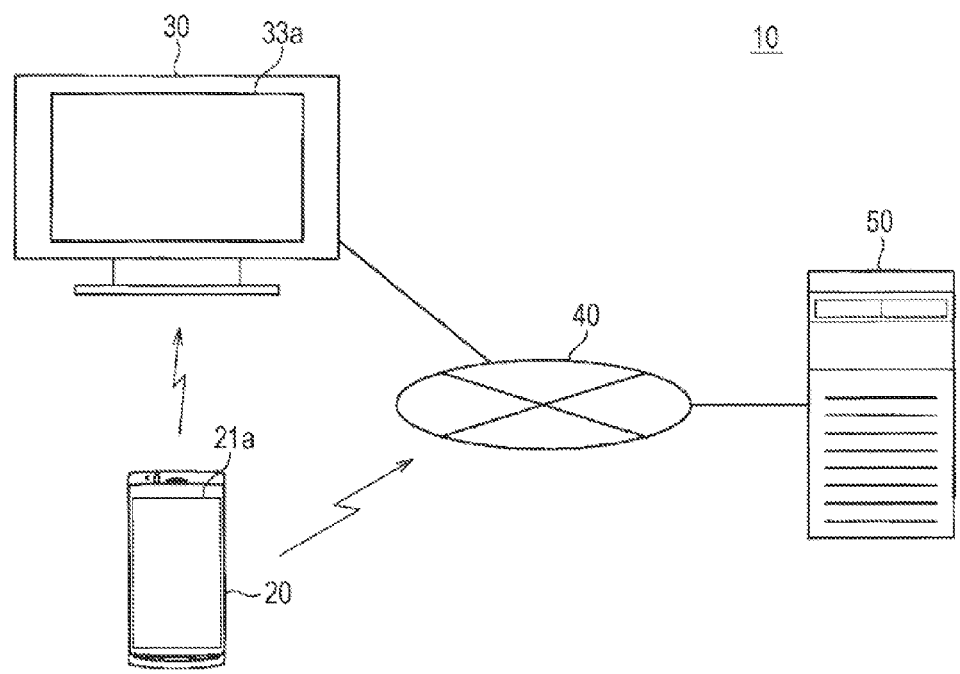
FIG. 1 is an illustration diagram of an information processing system according to an embodiment of the present disclosure.

A preferred embodiment of the present disclosure will be described in detail below with reference to the attached drawings. It should be noted that in the specification and the drawings, the same reference numeral is given to a component having substantially the same function/configuration, and an overlapping description will be omitted.

The description will be given in the following order.
1. General Configuration
2. Configuration of Communication Device
3. Configuration of Presentation Control Device
4. Example of Processing by Information Processing System <1. General Configuration>

First, a general configuration of an information processing system 10 according to an embodiment of the present disclosure will be described based on FIG. 1. The information processing system 10 has a communication device 20, a presentation control device 30, a communication network 40 and a server 50.

The communication device 20 is a mobile device that a user can carry and performs a wireless communication with the presentation control device 30. Hereinafter, a "user" means a user of the communication device 20 unless otherwise specified.

Moreover, the communication device 20 can connect to the communication network 40 through a repeater (for example, a wireless LAN router, a base station) not shown. The presentation control device 30 and the server 50 are connected to the communication network 40. Therefore, the communication device 20 can also communicate with them through the communication network 40.

Furthermore, the communication device 20 can obtain various types of content from the server 50. In other words, the server 50 provides content to the communication device 20 through a variety of web services.

The content provided by the server 50 is arbitrary. The content provided by the server 50 is exemplified by image content, blog (including short blog and micro blog), game, application, news, calendar (current date), schedule (schedule of user), message from another user and the like. Besides the above-mentioned ones, the content provided by the server 50 includes weather information, traffic information, coupon, audio content (music, radio program etc.) and the like. Here, the image content is exemplified by television program, movie, animation, web page, picture, album (collection of plural pictures), a scene from video, illustration, recipe, electronic book, advertisement and the like. The web page is exemplified by a front page of web service.

It should be noted that content in the present embodiment is provided with meta-information of the content. The meta-information of content includes anything related to the content. In a case where content is video content, for example, the meta-information includes information indicating characters, director, scenario, author and the like. In a case where content is audio content, the meta-information includes information indicating artist, music title and the like.

According to the present embodiment, the meta-information includes preference of a user for the content and rating of the content. The preference of a user for the content is a value indicating the number of times the user has used (e.g. watched) the content. As the number of times the user has used the content is increased, the value of the preference becomes larger. The rating of the content is a value indicating evaluation of the content by each user. As the evaluation of the content becomes higher, the value of the rating becomes larger. Moreover, a time limit for display of the content, namely a display time limit is set as the meta-information for some content such as coupon. When the display time limit has passed since the content is displayed, the content is deleted from a display panel. The display time limit with respect to coupon is usually set to a very short time (one second, for example). The reason is to increase rarity value of the coupon.

The communication device 20 displays a content display image regarding the obtained content on a display area (display panel) 21a. The content display image can be any image related to the content. For example, the content display image may be content itself or may be an image showing overview of the content. In a case where the content is audio content, the content itself cannot be displayed, and thus the content display image is an image showing overview of the audio content, for example an image with a music title and an artist name.

It should be noted that the communication device 20 can be any device as long as it can connect to the communication network 40 and display the content display image regarding the content. For example, the communication device 20 may be a desktop computer, a laptop computer, a game machine or the like.

The presentation control device 30 presents various types of content. That is, the presentation control device 30 displays image content and the like on a display area (display panel) 33a and outputs audio content from a speaker not shown. In addition, the presentation control device 30 performs a wireless communication with the communication device 20. Moreover, the presentation control device 30 is connected to the communication network 40 and can communicate with the communication device 20 and the server 50 through the communication network 40.

The communication network 40 serves as a communication path with respect to the communication device 20, the presentation control device 30 and the server 50. The communication network 40 may be the Internet or may be a local network in a house and a company.

It should be noted that while the information processing system 10 is provided with one communication device, one presentation control device and one server in FIG. 1, the number of each component is not limited to that.

<2. Configuration of Communication Device>

Figure 2:
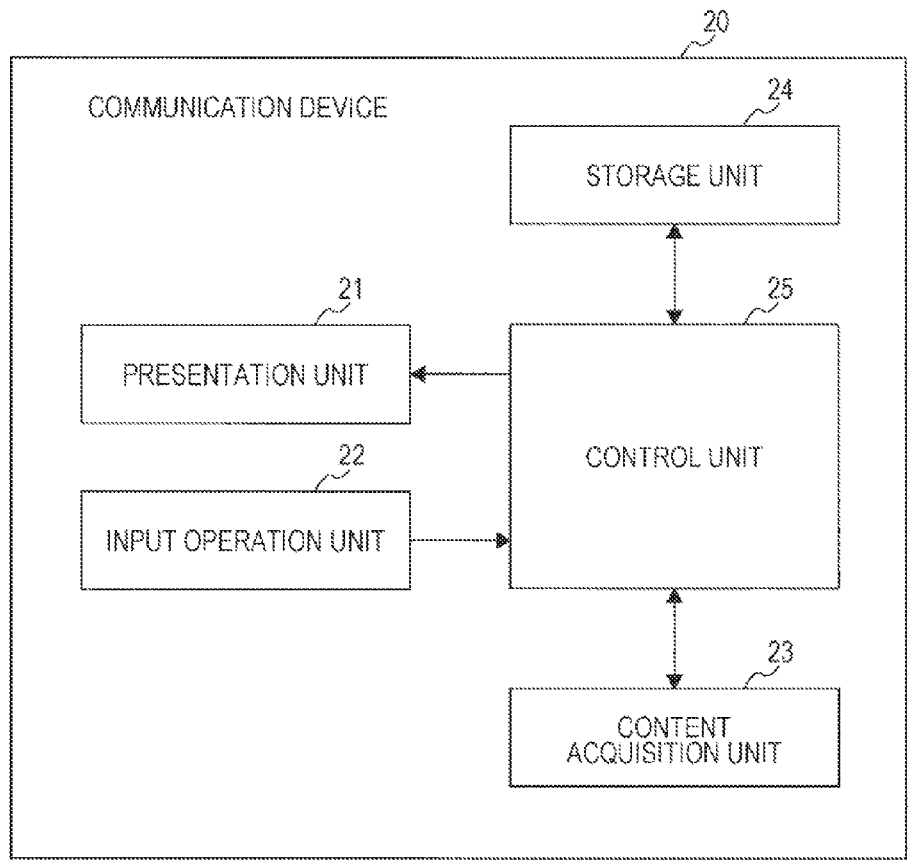
FIG. 2 is a block diagram of a communication device according to the embodiment.

Next, a configuration of the communication device 20 will be described based on FIGS. 1 and 2. As shown in FIG. 2, the communication device 20 has a presentation unit 21, an input operation unit 22, a content acquisition unit 23, a storage unit 24 and a control unit 25. That is, the communication device 20 has hardware structures including a CPU, a ROM, a RAM, a touch panel, a display, a communication antenna and the like, and the above-mentioned components are realized by the hardware structures.

The presentation unit 21 is a so-called display and has the display area 21a. The presentation unit 21 displays various types of image content and the like on the display area 21a and outputs various types of audio content from a speaker not shown. For example, the presentation unit 21 displays a content display image on the display area 21a and moves the content display image within the display area 21*a*. The details will be described later. The input operation unit 22 is a so-called touch panel and outputs operation information depending on an input operation by a user to the control unit 25.

The content acquisition unit 23 obtains various types of content through the communication network 40. That is, the content acquisition unit 23 can connect to the communication network 40 through a repeater. The content acquisition unit 23 connects to the server 50 through the communication network 40 to obtain various types of content. Moreover, the content acquisition unit 23 performs a wireless communication with the presentation control device 30.

The storage unit 24 stores various types of information such as image information, audio information and a program required for the communication device 20 to execute various types of processing. The control unit 25 controls each component of the communication device 20. In particular, the control unit 25 performs: control of displaying the content display image on the display area 21*a*; and control of automatically moving the content display image within the display area 21*a* (i.e. control of changing a display position of the content display image in the display area 21*a*). The details will be described later. The program causes the communication device 20 to achieve the above-mentioned functional blocks, especially the content acquisition unit 23 and the control unit 25.

<3. Configuration of Presentation Control Device>

Figure 3:
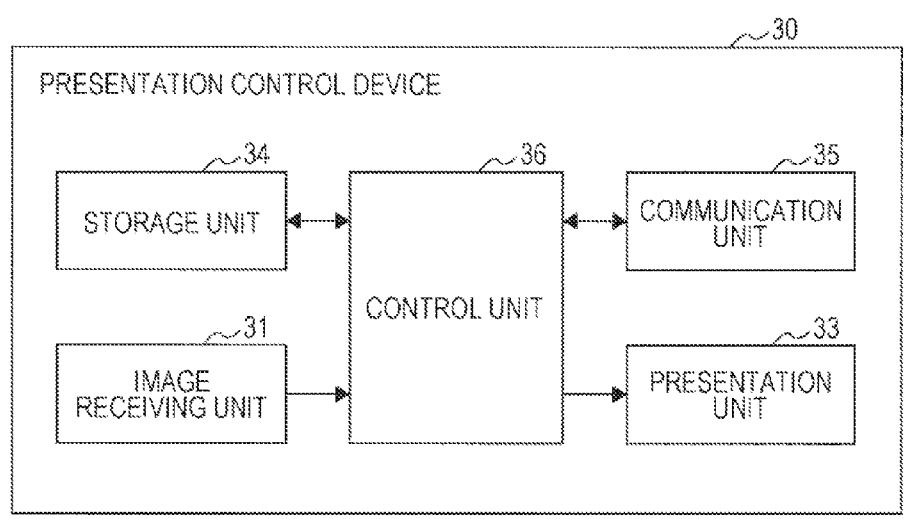
FIG. 3 is a block diagram of a presentation control device according to the embodiment.

Next, a configuration of the presentation control device 30 will be described based on FIGS. 1 and 3. The presentation control device 30 has an image receiving unit 31, a presentation unit 33, a storage unit 34, a communication unit 35 and a control unit 36. That is, the presentation control device 30 has hardware structures including a CPU, a ROM, a RAM, a hard disk drive, a display, a communication antenna and the like, and the above-mentioned components are realized by the hardware structures.

The image receiving unit 31 receives broadcasting including various types of image content and audio content and extracts desired content from the received broadcasting. It should be noted that content included in the broadcasting is provided with the meta-information of the content. The image receiving unit 31 outputs the extracted content to the control unit 36.

The presentation unit 33 is a so-called display and has the display area (display panel) 33*a*. The presentation unit 33 presents reference content. That is, the presentation unit 33 displays image content included in the reference content on the display area 33*a* and outputs audio content included in the reference content from a speaker not shown.

The storage unit 34 stores various types of information such as various types of image information, audio information and a program required for processing performed by the presentation control device 30.

The communication unit 35 not only performs a wireless communication with the communication device 20 but also performs a communication with the communication device 20 and the server 50 through the communication network 40.

The control unit 36 controls each component of the presentation control device 30. Moreover, the control unit 36 performs various types of preprocessing (for example, image processing such as gamma processing) with respect to the reference content supplied from the image receiving unit 31. The control unit 36 causes the presentation unit 33 to present the reference content to which the preprocessing has been performed. In addition, the control unit 36 stores the meta-information included in the reference content in the storage unit 34.

<4. Example of Processing by Information Processing System>

Next, an example of processing by the information processing system 10 will be described based on a sequence diagram shown in FIG. 4 and a flowchart shown in FIG. 5.

First, a user of the communication device 20 uses the communication device 20 to cause the presentation control device 30 to present desired reference content. More specifically, the user inputs operation information of designating the reference content (for example, operation information designating a channel name) to the input operation unit 22. The input operation unit 22 outputs the input operation information to the control unit 25. The control unit 25 outputs the operation information to the content acquisition unit 23. The content acquisition unit 23 transmits the operation information to the presentation control device 30. The communication unit 35 of the presentation control device 30 receives the operation information and outputs the operation information to the control unit 36. The control unit 36 causes the image receiving unit 31 to obtain the reference content designated by the operation information. The image receiving unit 31 outputs the received reference content to the control unit 36. The control unit 36 performs the preprocessing with respect to the reference content and then causes the presentation unit 33 to present the reference content. Meanwhile, the control unit 36 causes the storage unit 34 to store meta-information included in the reference content.

Next, in Step S10, the control unit 25 of the communication device 20 generates meta-information request that requests for the meta-information of the reference content and outputs the meta-information request to the content acquisition unit 23. The content acquisition unit 23 transmits the meta-information request to the presentation control device 30.

In Step S20, the communication unit 35 of the presentation control device 30 receives the meta-information request and outputs the meta-information request to the control unit 36. The control unit 36 obtains the meta-information from the storage unit 34 and outputs the meta-information to the communication unit 35. The communication unit 35 transmits the meta-information to the communication device 20. The content acquisition unit 23 of the communication device 20 receives the meta-information and outputs the meta-information to the control unit 25. The control unit 25 causes the storage unit 24 to store the meta-information.

Next, in Step S30, the control unit 25 sets some search criteria to be used when the server 50 searches for content.

More specifically, the control unit 25 sets the following criteria as first search criteria; the content includes the meta-information, the preference of a user for the content is higher than predetermined reference preference and the rating of the content is higher than predetermined reference rating. Moreover, the control unit 25 sets the following criteria as second search criteria; the preference of a user for the content is higher than predetermined reference preference and the rating of the content is higher than predetermined reference rating.

It should be noted that the communication device 20 may have a GPS function. In this case, the control unit 25 can measure a current position of the communication device 20 by using the GPS function and set the search criteria based on the measured current position. That is, for example, the control unit 25 may incorporate an installation position condition that the content is executed more than a predetermined number of times within a 10 km radius from the communication device 20, into the above-mentioned first search criteria and second search criteria. The communication device 20 may have a voice taking-in function, namely a microphone. In this case, a user inputs audio information by using the microphone. The control unit 25 may set the input audio information as the meta-information of the content.

The control unit 25 outputs search criteria information regarding the first search criteria and the second search criteria to the content acquisition unit 23. The content acquisition unit 23 requests the server 50 for content. More specifically, the content acquisition unit 23 transmits the search criteria information to the server 50.

In Step S40, the server 50 searches content stored in itself for content satisfying the first search criteria and content satisfying second search criteria, based on the search criteria information. The server 50 may search for content not satisfying the search criteria in a random manner. The server 50 transmits the retrieved content to the communication device 20. It should be noted that the content transmitted from the server 50 includes the meta-information described above. The content acquisition unit 23 of the communication device 20 receives the content and outputs the content to the control unit 25. The control unit 25 causes the storage unit 24 to store the content.

Figure 6:
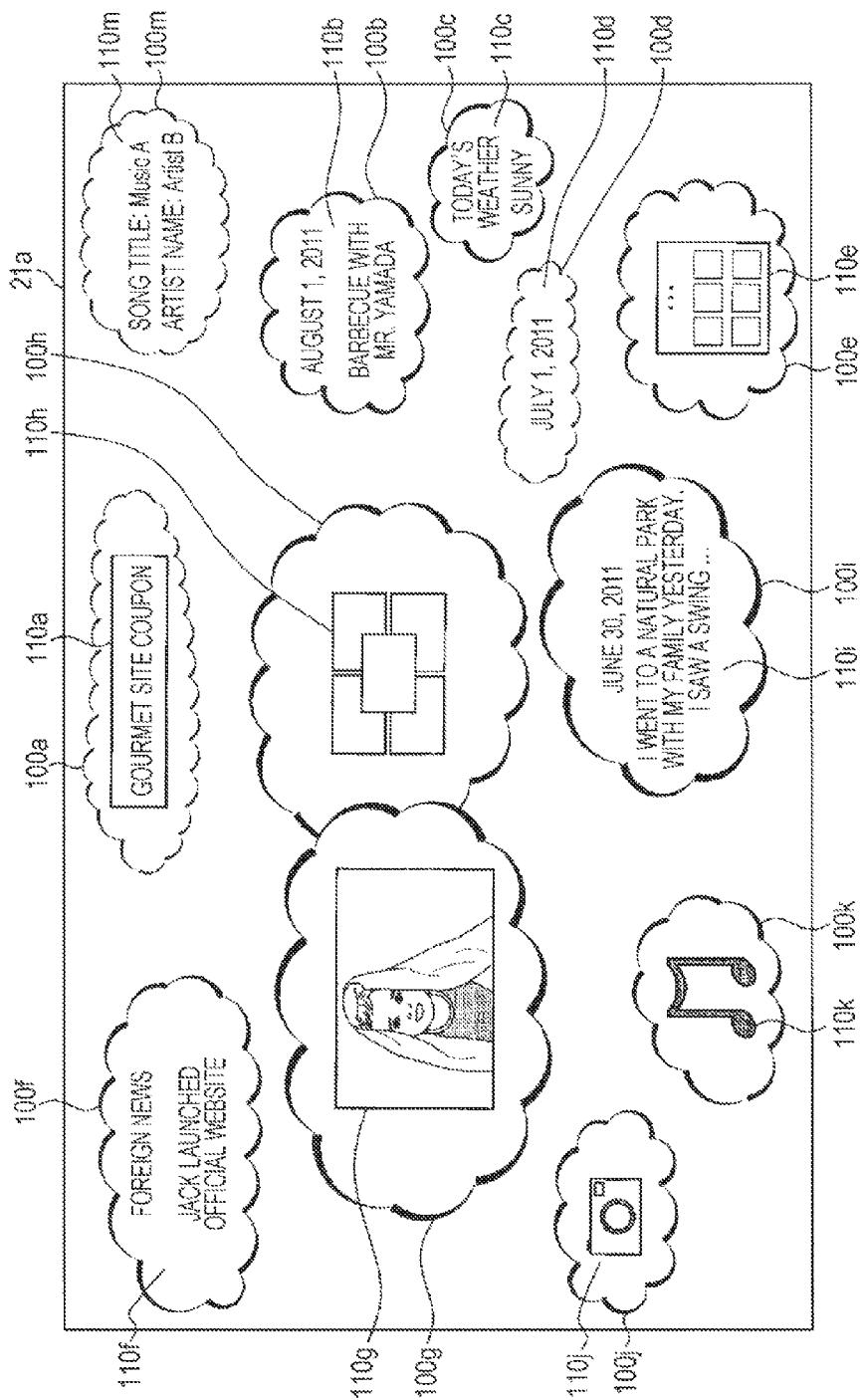
FIG. 6 is an illustration diagram of an example of an image displayed by the communication device.

In Step S50, the control unit 25 performs content display processing shown in FIG. 6 with respect to a single or multiple pieces of content. That is, in Step S100, the control unit 25 generates a content display image regarding the content. Here, the content display image may be content itself or may be an image showing overview of the content. Furthermore, the control unit 25 adjusts a size of the content display image based on the preference of the user for the content and the rating of the content. More specifically, the control unit 25 increases the size of the content display image as the preference and the rating are higher.

Next, the control unit 25 determines whether or not the meta-information of the content includes the above-mentioned display time limit, namely whether or not the display time limit is set for the content. If no display time limit is set for the content, the control unit 25 sets a display time limit. The control unit 25 causes the storage unit 24 to store the set display time limit as the meta-information of the content.

Based on the display time limit, the control unit 25 determines a migration route and migration speed of the content display image within the display area 21a. For example, the migration route is a route along which a pixel constituting a center of the content display image passes through the display area 21a. A start point of the migration route is an arbitrary point within the display area 21a, and an end point thereof is a point outside the display area 21a. When a content display image reaches the end point, the whole of the content display image is located outside the display area 21a (i.e. the content display image disappears from the display area 21a). It should be noted that the end point may also be a point within the display area 21a. In this case, the content display image disappears within the display area 21a when reaching the end point. At the time when the content display image disappears, there may be some kind of effect (for example, the content display image bursts).

Moreover, the migration route is set such that the content display image migrates in the display area 21a as randomly as possible. That is, a traveling direction regarding the migration route changes in a random manner. As a result, the content display image is displayed as if it floats within the display area 21a.

The migration speed is calculated by dividing a length of the migration route by the display time limit. In the present embodiment, the migration speed is preferably set as low as possible in order to provide the content display image with feeling of floating. In addition, the migration speed being low brings a benefit that a user can select the content display image more easily. It should be noted that the migration route and the migration speed may be reviewed at regular time intervals. In this case, the migration route and the migration speed are calculated based on a remaining time of the display time limit.

Subsequently, the control unit 25 generates a migration image that migrates within the display area 21a. The migration image has a cloud shape and its size is larger than that of the content display image. It should be noted that the shape of the migration image is not limited to the cloud shape. For example, the migration image may have a shape of bubble soap.

Moreover, the control unit 25 may generate a content display image and performs the same processing as described above with respect to content stored in the storage unit 24, namely so-called local content. Such the local content is exemplified by picture content taken by a user and the like. It should be noted that the local content for which the content display image is generated may be arbitrary or may be one satisfying the search criteria described above. The display time limit of the local content may be set or may not be set. If the display time limit is not set, the content display image for the local content is not deleted from the table area 21a.

Next, the control unit 25 performs superimposed display of the migration image and the content display image in the display area 21a. The content display image is placed within the migration image. The control unit 25 moves the migration image and the content display image along the above-mentioned migration route at the migration speed within the display area 21a. As a result, the content display image migrates as if it floats within the table area 21a. Therefore, a state in which the content display image migrates is "floating state". In other words, the control unit 25 displays the content display image in the floating state. When initiating the display of the content display image, the control unit 25 turns on a time-to-replacement measurement timer and a display time limit measurement timer. Details of the timers will be described later.

The control unit 25 moves the content display image and the migration image within the display area 21a in parallel with the following processing from Step S110 to Step S200.

FIG. 6 illustrates a display example. In this example, migration images 100a to 100k are displayed and content display images 110a to 110k are overlaid on the migration images 100a to 100k, respectively.

The content display image 110a shows coupon content. The content display image 110b shows schedule content. The content display image 110c shows weather information. The content display image 110d shows calendar content.

The content display image 110e shows a web page, specifically a front page of a web service. That is, the content display image 110e shows the web service itself instead of content itself. The content display image 110f shows news content. It should be noted that the content display image 110f is not the news content itself but an image showing overview of the news content, specifically an image showing a source of news and a title of news.

The content display image 110g shows video content. The content display image 110h shows album content. It should be noted that the content display image 110h is not the album content itself but an image showing overview of the album content, specifically an image obtained by overlaying plural pieces of picture content. The content display image 110i shows blog. It should be noted that the content display image 110i is not the blog itself but an image showing overview of the blog, specifically an image showing a part of the blog.

The content display image 110*j* shows picture content taken by a user among the local content. It should be noted that the content display image 110*j* is not the picture content itself but an image implying the picture content, specifically a camera image. The content display image 110*k* shows audio content recorded by a user (stored in the storage unit 24) among the local content. The content display image 110*k* is an image implying the audio content, specifically a musical note image.

The content display image 110*m* shows audio content. The content display image 110*m* is not the audio content itself but an image showing overview of the audio content, specifically an image showing a music name and an artist name.

As described above, the content display images 110*a* to 110*k* have respective sizes depending on the preference of a user and the rating. In the present example, the preference of a user and the rating with regard to the content display image 110*g* are the highest.

Figure 7:
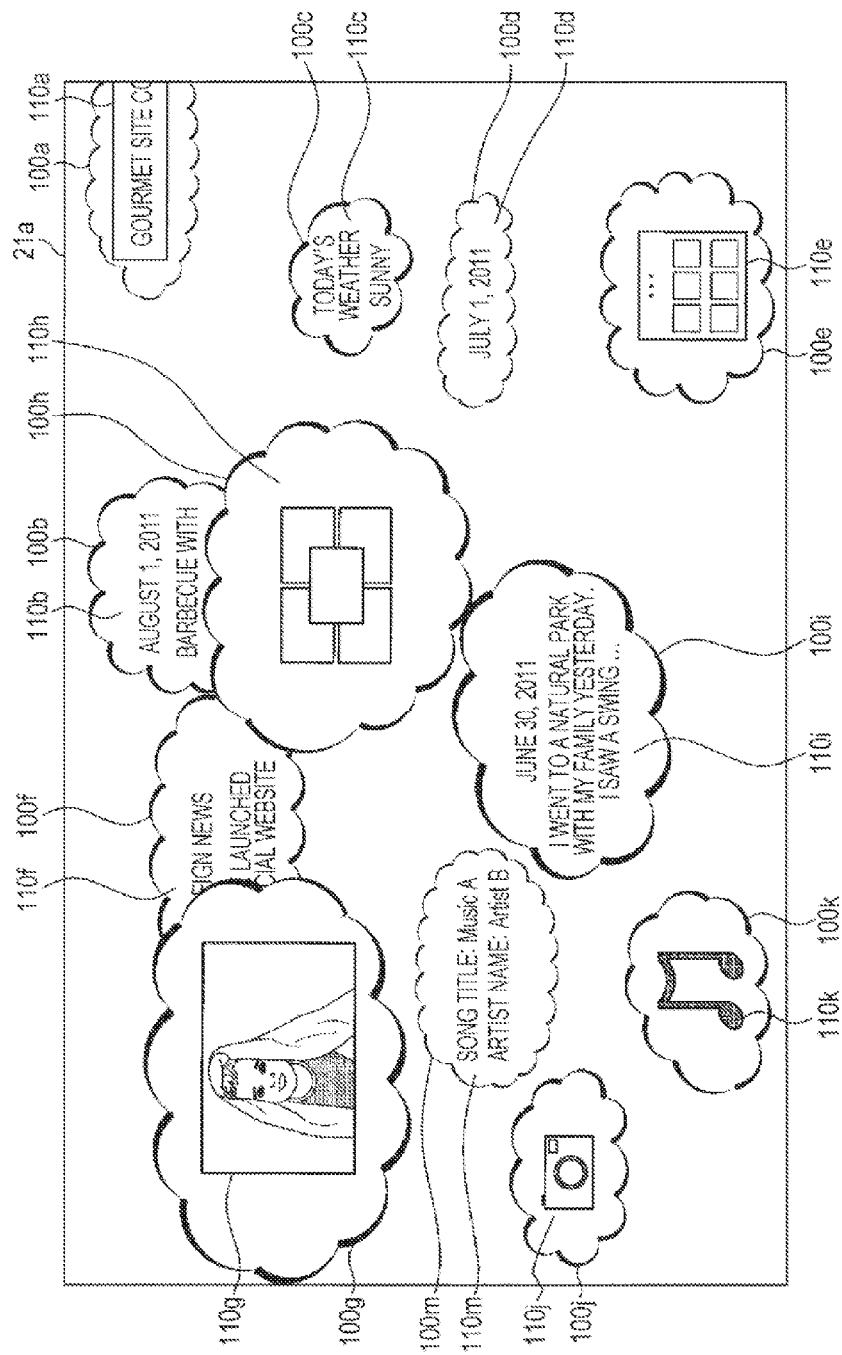
FIG. 7 is an illustration diagram of an example of an image displayed by the communication device.
Figure 8:
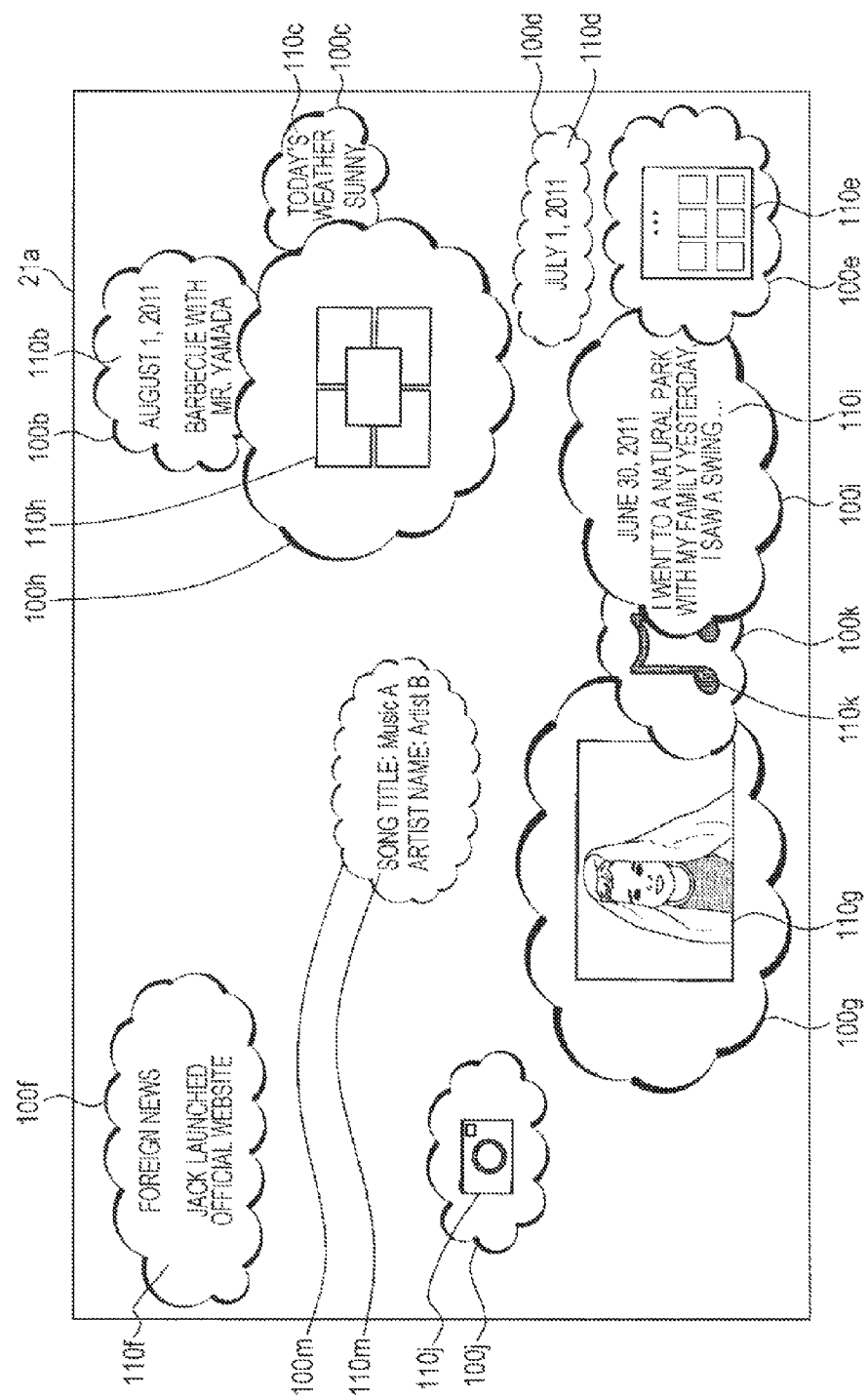
FIG. 8 is an illustration diagram of an example of an image displayed by the communication device.

As shown in FIGS. 6 to 8, the content display image 110*a* to 110*k* migrate on the respective migration routes set by the control unit 25 at the respective migration speeds set by the control unit 25. It should be noted that since the display time limit with respect to the coupon content is very short, the content display image 110*a* regarding the coupon content immediately moves out of the display area 21*a* after being displayed on the display area 21*a*. Moreover, since the content display image 110*g* is related to the video content, its contents change from moment to moment during migration.

In Step S110, the control unit 25 determines whether or not there is a selection operation by a user. When determining that there is a selection operation by the user, the control unit 25 proceeds to Step S120. When determining that there is no selection operation by the user, the control unit 25 proceeds to Step S160. It should be noted that when the user finds a content display image regarding desired content, the user touches the content display image. In this manner, the user performs the selection operation with respect to the content display image.

In Step S120, the control unit 25 changes a state of the content display image selected by the user to a fixed state. Here, the fixed state means a state that a display position is fixed. It should be noted that the content display image is set to the fixed state at a position where the user touches it. Moreover, the control unit 25 displays a fixed image having a substantially rectangular shape and places the content display image in the fixed state within the fixed image. Moreover, the control unit 25 displays a pin image near the fixed image and overlays a point (needle portion) of the pin image on the fixed image. As a result, the content display image and the fixed image are secured by the pin image. Furthermore, the control unit 25 identifies the content shown by the content display image and increases the preference of the user for the identified content.

Figure 9:
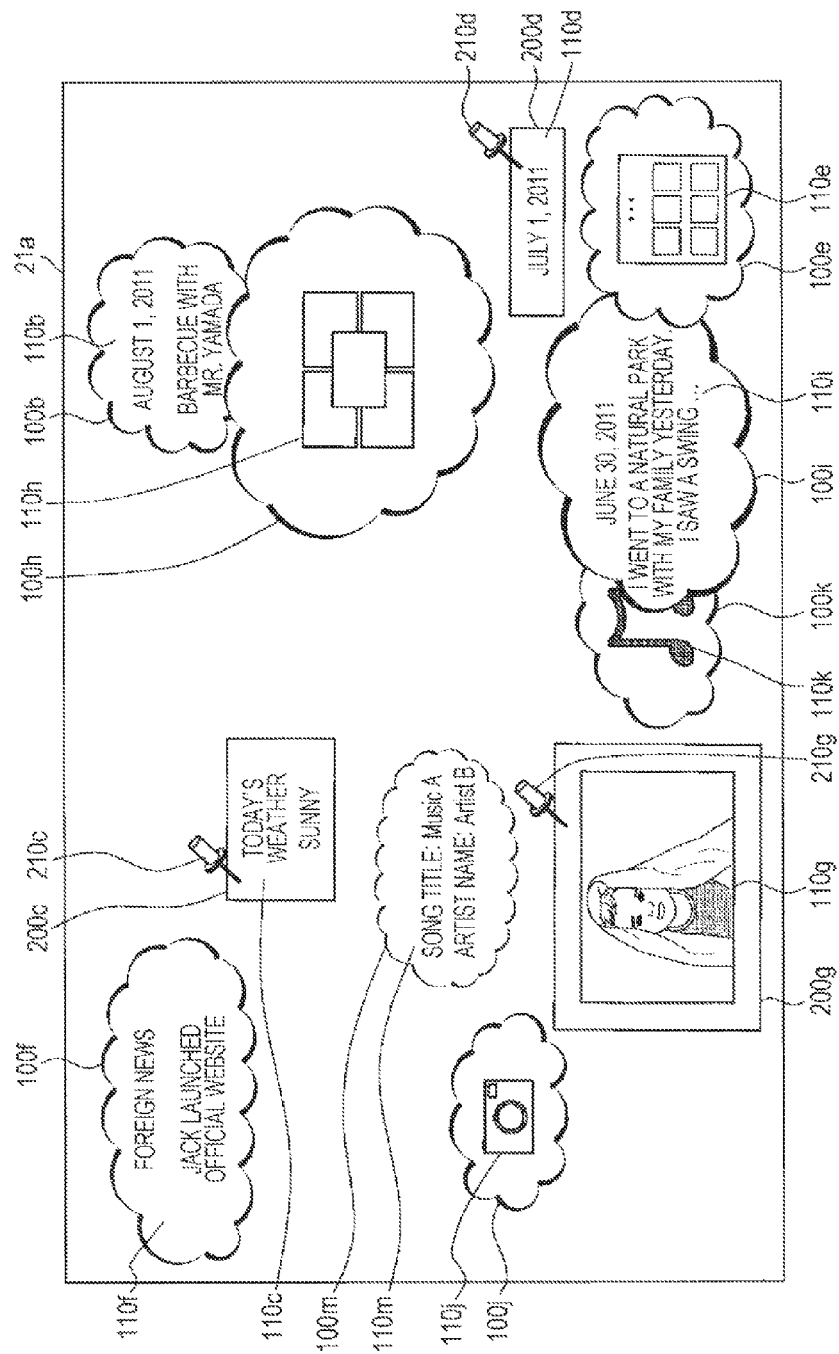
FIG. 9 is an illustration diagram of an example of an image displayed by the communication device.

FIG. 9 illustrates a display example. In this example, the content display images 110*c*, 110*d* and 110*g* are set to the fixed state. The content display images 110*c*, 110*d* and 110*g* are placed within fixed images 200*c*, 200*d* and 200*g*, respectively. Pin images 210*c*, 210*d* and 210*g* are respectively displayed near the fixed images 200*c*, 200*d* and 200*g*, and their needle portions are respectively overlaid on the fixed images 200*c*, 200*d* and 200*g*.

Figure 10:
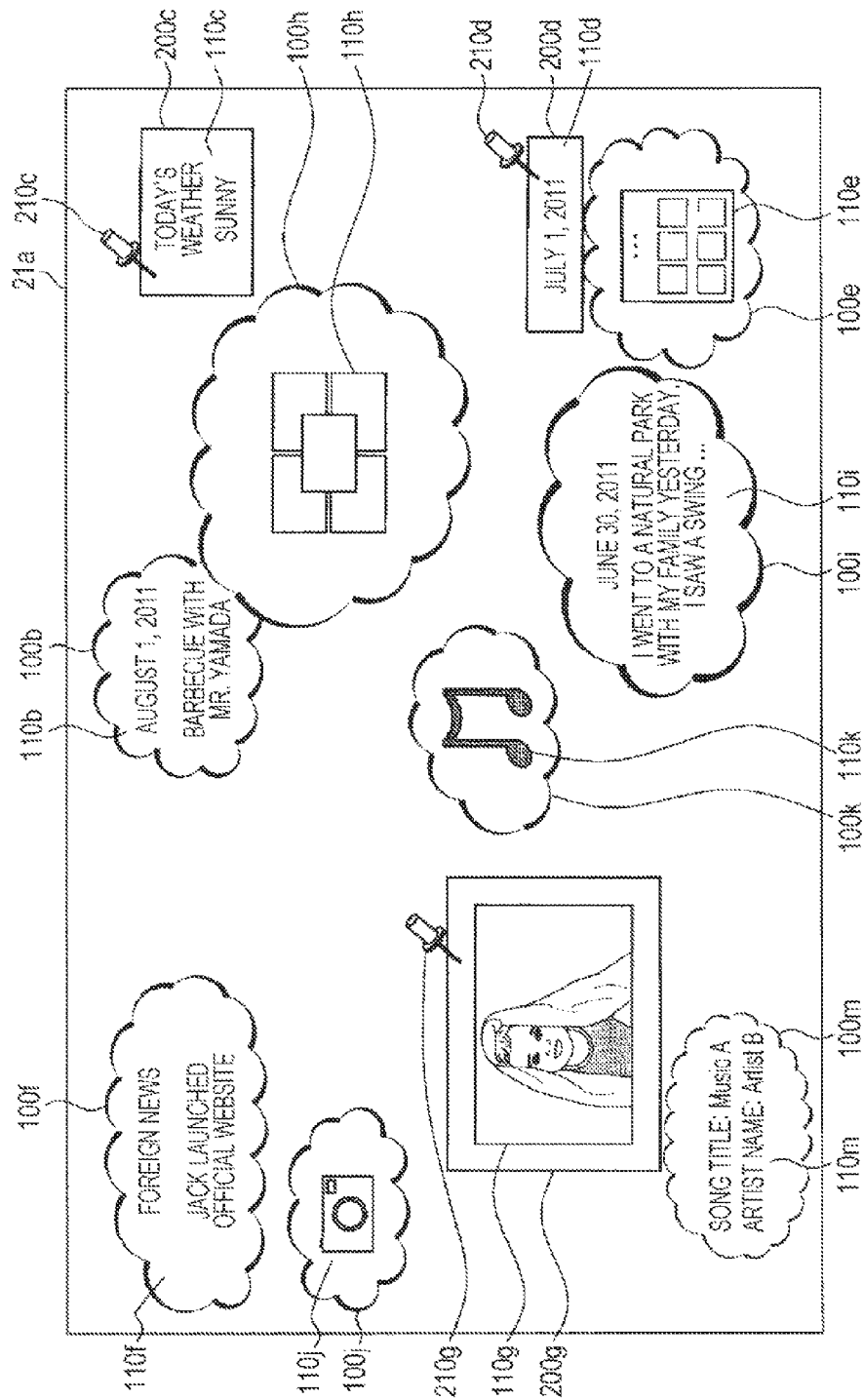
FIG. 10 is an illustration diagram of an example of an image displayed by the communication device.

Moreover, the user can move the content display image in the fixed state. More specifically, the user keeps a finger touching the content display image in the fixed state and moves the finger to a desired position within the display area 21*a*. The control unit 25 displaces the content display image in the fixed state in accordance with the motion of the user's finger. FIG. 10 illustrates a display example. In this example, the content display image 110*c* is displaced to the upper right portion of the display area 21*a*. It should be noted that the control unit 25 may displace the content display image in the floating state in accordance with a similar input operation. In this case, the migration route and the migration speed with respect to the content display image after the displacement are recalculated based on a remaining time of the display time limit.

Furthermore, the user can select processing with respect to the content display image in the fixed state from execute, bookmark registration, save and delete. More specifically, the user touches the content display image in the fixed state. In response to the input operation, the control unit 25 displays a list including the processing mentioned above. The user can select desired processing from the processing listed in the list by touching a row indicating the desired processing. The control unit 25 executes the selected processing. More specifically, if execute is selected, the control unit 25 executes the content corresponding to the content display image. If bookmark registration is selected, the control unit 25 stores the content corresponding to the content display image (or a web service providing the content) as a bookmark in the storage unit 24. If save is selected, the control unit 25 saves the content corresponding to the content display image to the storage unit 24. The saved content is not deleted from the storage unit 24 by processing of Step S200 to be described later. If delete is selected, the control unit 25 deletes the content display image from the display area 21*a* and further deletes the content corresponding to the content display image from the storage unit 24.

Figure 11:
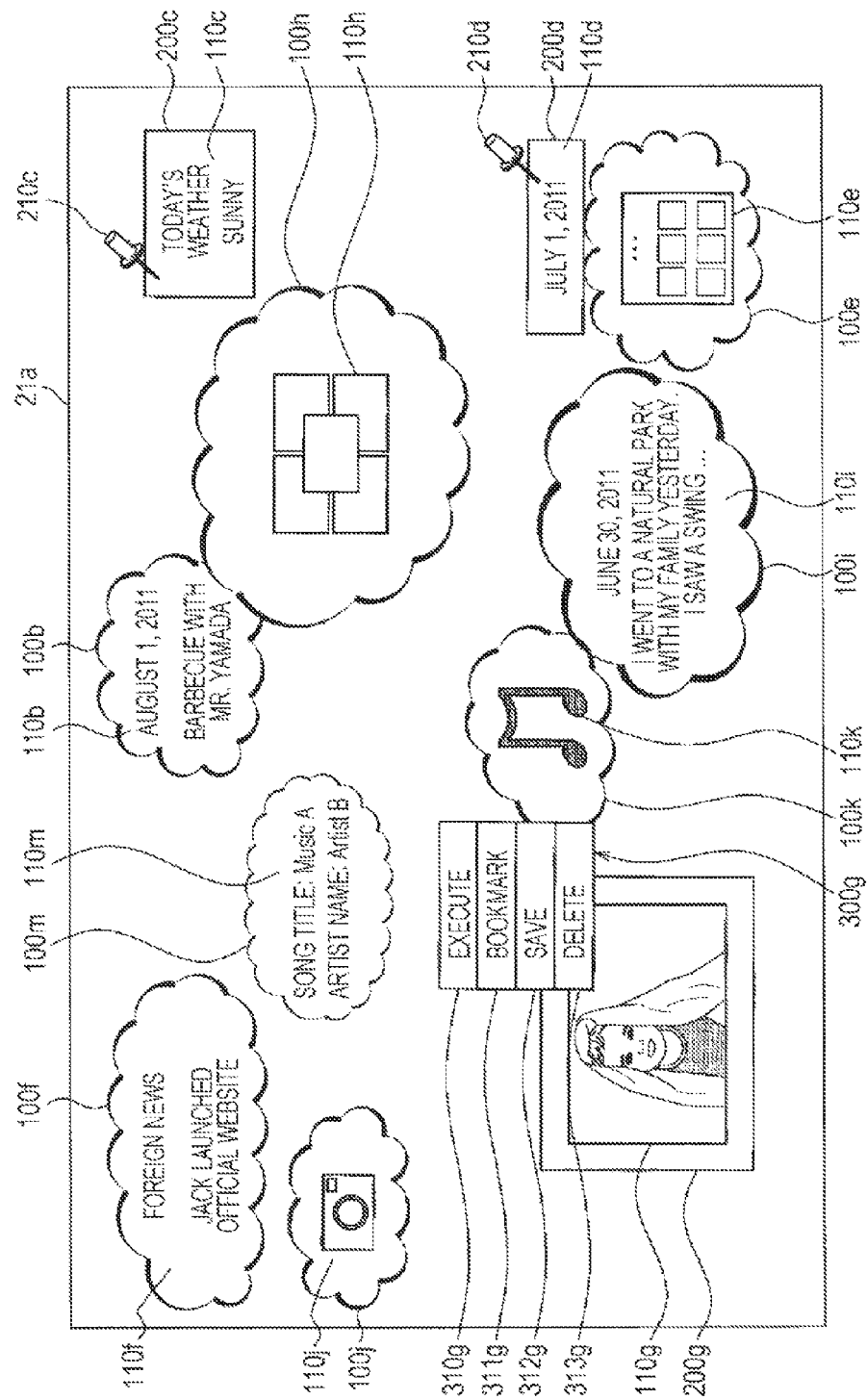
FIG. 11 is an illustration diagram of an example of an image displayed by the communication device.
Figure 12:
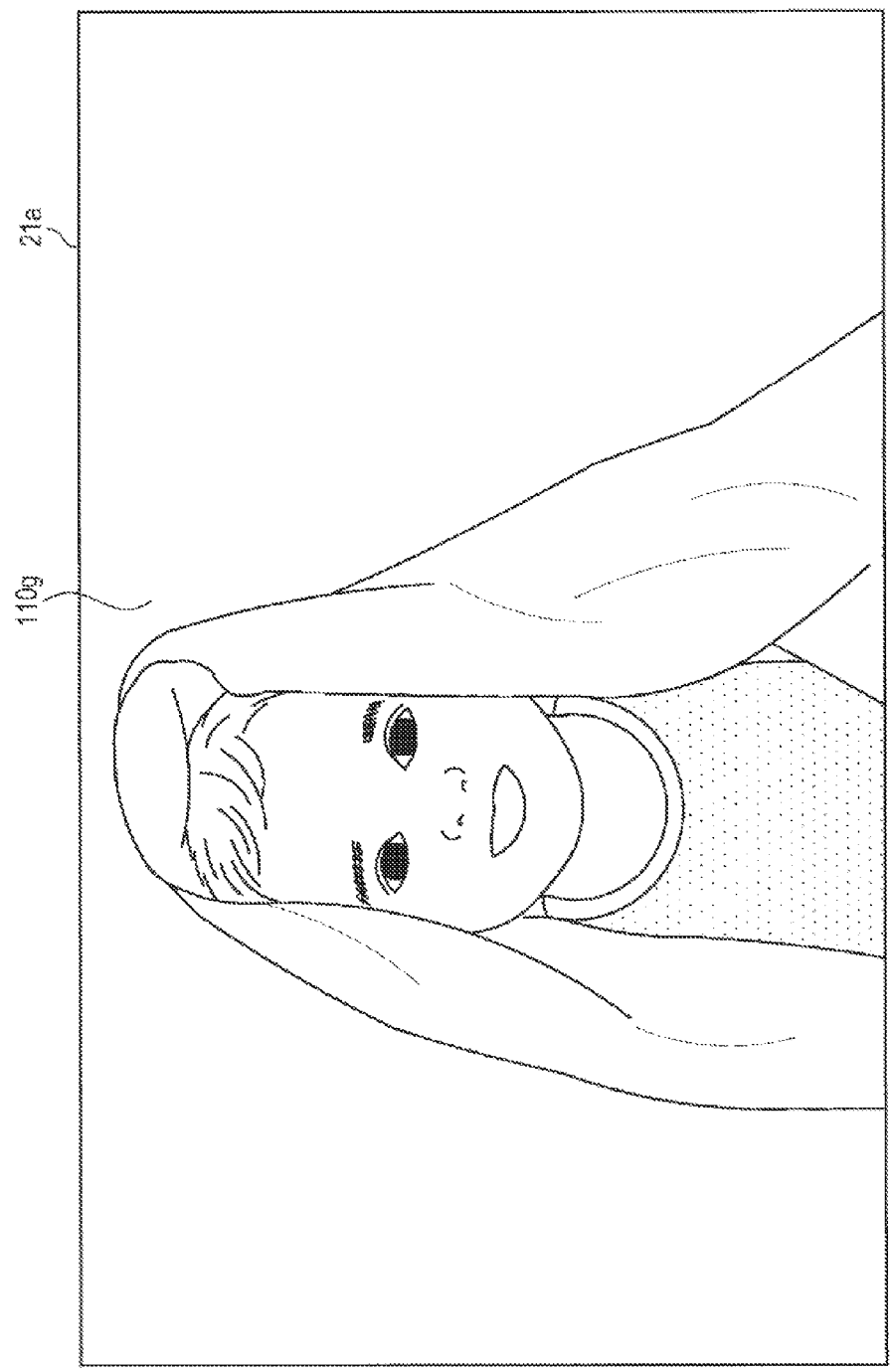
FIG. 12 is an illustration diagram of an example of an image displayed by the communication device.

FIG. 11 illustrates a display example. In this example, a list 300*g* is displayed with respect to the content display image 110*g*. The list 300*g* includes a row 310*g* in which a word "execute" is described, a row 311*g* in which a word "bookmark" is described, a row 312*g* in which a word "save" is described, and a row 313*g* in which a word "delete" is described. FIG. 12 illustrates an example where the video content corresponding to the content display image 110*g* is executed. In this example, the video content is displayed over the entire display area 21*a*.

It should be noted that if the content display image is an image implying the content, the user cannot recognize the details of the content just by looking at the content display image. Therefore, the control unit 25 performs the following processing. That is, when the user touches the content display image, the control unit 25 displays a list of the content implied by the content display image. The user selects desired content from the content listed in the list. The control unit 25 executes the selected content.

Figure 13:
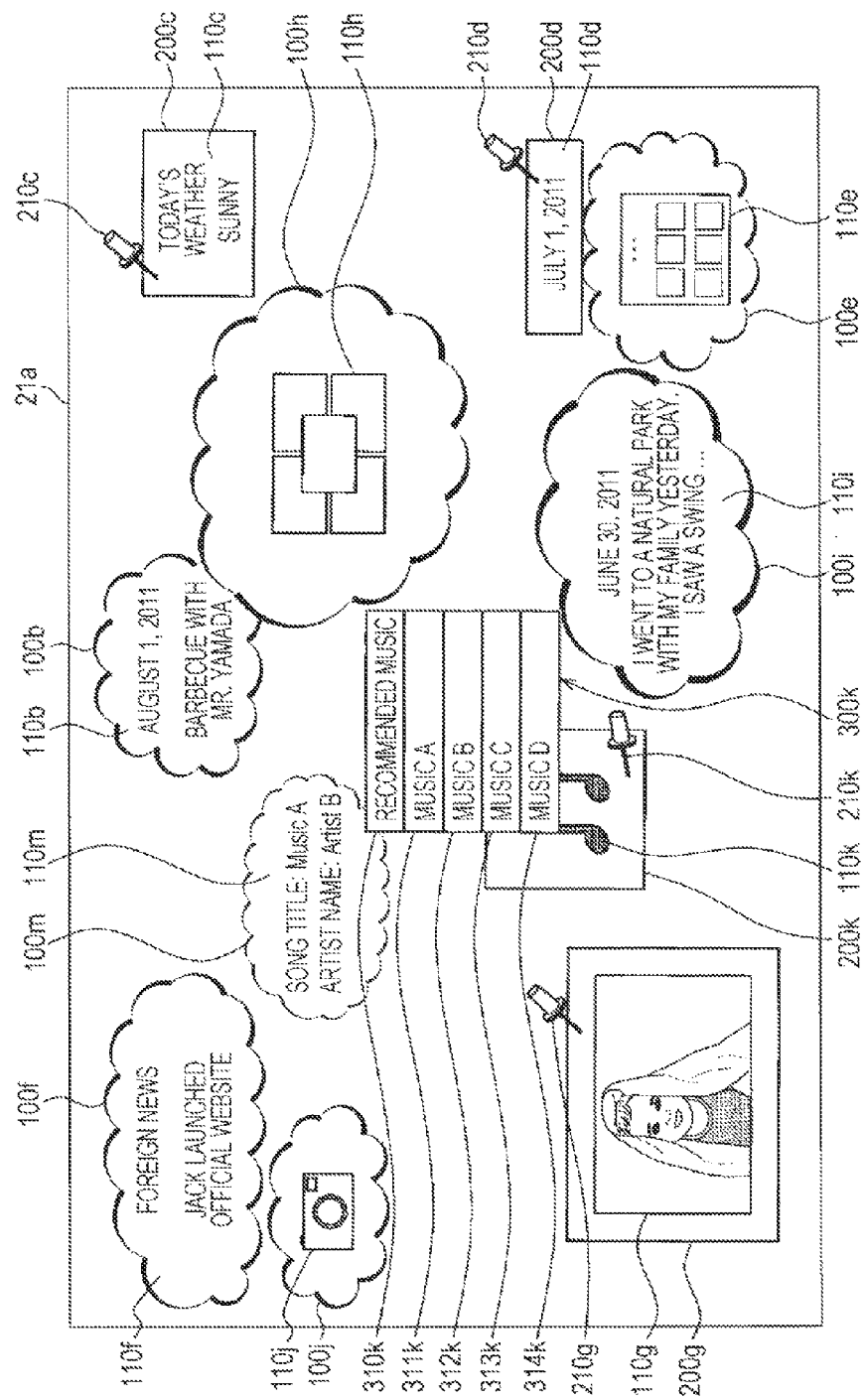
FIG. 13 is an illustration diagram of an example of an image displayed by the communication device.

FIG. 13 illustrates a display example. In this example, a list 300*k* is displayed with respect to the content display image 110*k*. The list 300*k* includes a row 310*k* indicating that the content display image corresponds to audio content, a row 311*k* in which words "music A" are described, a row 312*k* in which words "music B" are described, a row 313*k* in which words "music C" are described, and a row 314*k* in which words "music D" are described. The user selects a row in which a desired music among the music A to D is described. The control unit 25 outputs the selected music from a speaker not shown.

In Step S130, the control unit 25 determines whether or not a release operation has been performed with respect to the content display image in the fixed state. When determining that the release operation has been performed, the control unit 25 proceeds to Step S140. When determining that the release operation has not been performed, the control unit 25 returns to Step S120. Here, the release operation is an operation of pulling the pin image, for example. The user can perform the release operation by touching the pin image with a finger and then moving the finger in a direction away from the content display image in the fixed state.

In Step S140, the control unit 25 determines whether or not the display time limit measurement timer indicates a time equal to or more than the display time limit. When determining that the display time limit measurement timer indicates a time equal to or more than the display time limit, the control unit 25 proceeds to Step S200. When determining that the display time limit measurement timer indicates a time less than the display time limit, the control unit 25 proceeds to Step S150.

In Step S150, the control unit 25 changes the content display image in the fixed state back to the floating state. Furthermore, the control unit 25 calculates the migration route and the migration speed based on a remaining time of the display time limit (i.e. a time obtained by subtracting the time indicated by the display time limit measurement timer from the display time limit). The control unit 25 moves the content display image along the newly-calculated migration route at the newly-calculated migration speed.

In Step S160, the control unit 25 determines whether or not the time-to-replacement measurement timer indicates a time equal to or more than a predetermined time-to-replacement. When determining that the time-to-replacement measurement timer indicates a time equal to or more than the time-to-replacement, the control unit 25 proceeds to Step S170. When determining that the time-to-replacement measurement timer indicates a time less than the predetermined time-to-replacement, the control unit 25 returns to Step S110.

In Step S170, the control unit 25 resets the value of the time-to-replacement measurement timer to zero and then restarts the time measurement by the time-to-replacement measurement timer. Next, the control unit 25 determines whether or not content of the same type as the content shown by the content display image (such content is hereinafter referred to also as "replacement content") is stored in the storage unit 24. When determining that any replacement content is stored in the storage unit 24, the control unit 25 proceeds to Step S180. When determining that no replacement content is stored in the storage unit 24, the control unit 25 proceeds to Step S190.

In Step S180, the control unit 25 replaces the content display image by a content display image regarding the replacement content. It should be noted that the size, the migration route and the migration speed of the content display image are taken over by the post-replacement content display image. FIG. 14 illustrates a display example. In this example, the content display images 110b, 110f and 110g are replaced by content display images 120b, 120f and 120g, respectively. It should be noted that control unit 25 may change a size of the post-replacement content display image based on the preference of the user for the replacement content and the rating of the replacement content. The control unit 25 may change the migration route and the migration speed in accordance with the processing of Step S100 described above.

In Step S190, the control unit 25 determines whether or not the display time limit measurement timer indicates a time equal to or more than the display time limit. When determining that the display time limit measurement timer indicates a time equal to or more than the display time limit, the control unit 25 proceeds to Step S200. When determining that the display time limit measurement timer indicates a time less than the display time limit, the control unit 25 returns to Step S110.

In Step S200, if the content display image remains within the display area 21a, the control unit 25 deletes the content display image. Furthermore, the control unit 25 deletes the content shown by the content display image and content of the same type from the storage unit 24. After that, the control unit 25 concludes the content display processing.

Figure 4:
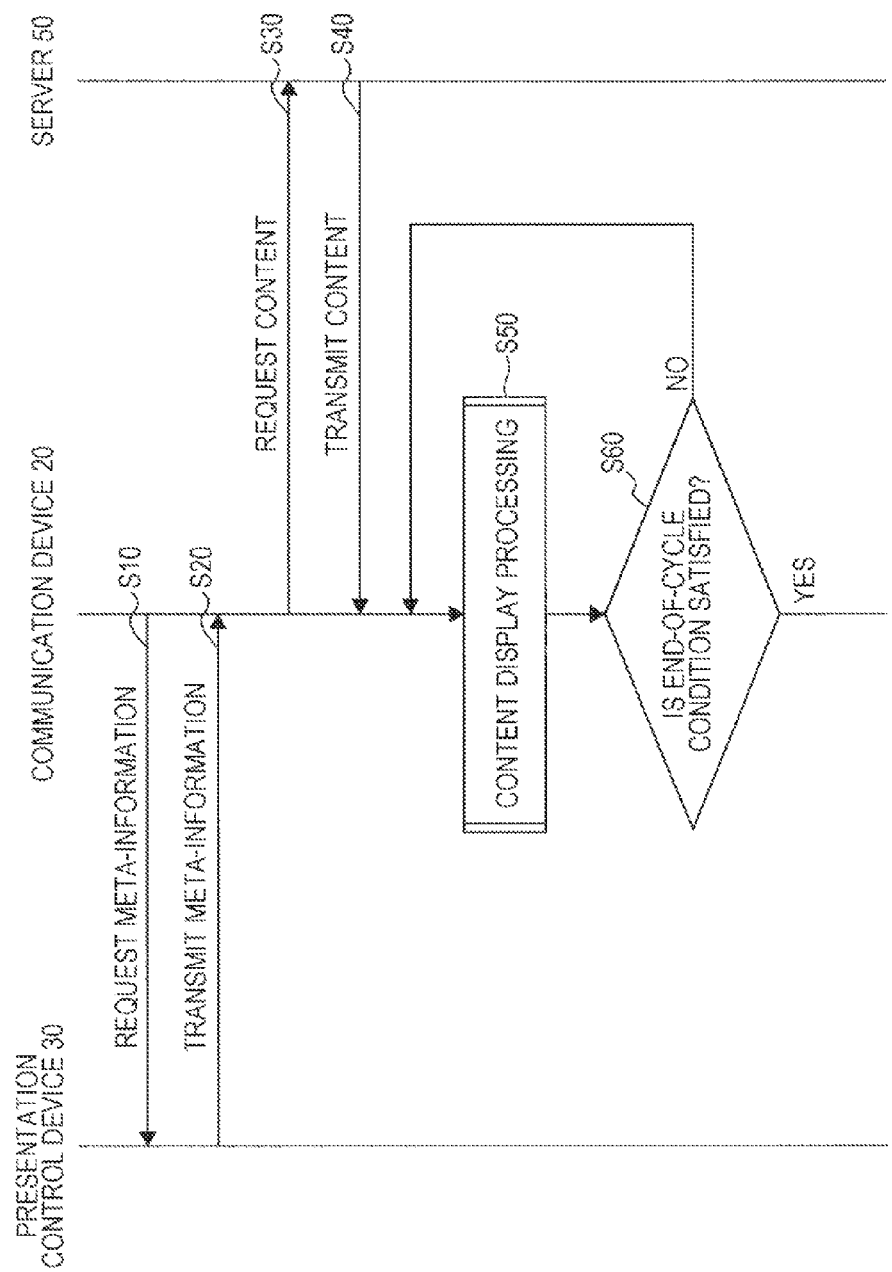
FIG. 4 is a sequence diagram of an example of processing by the information processing system.
Figure 5:
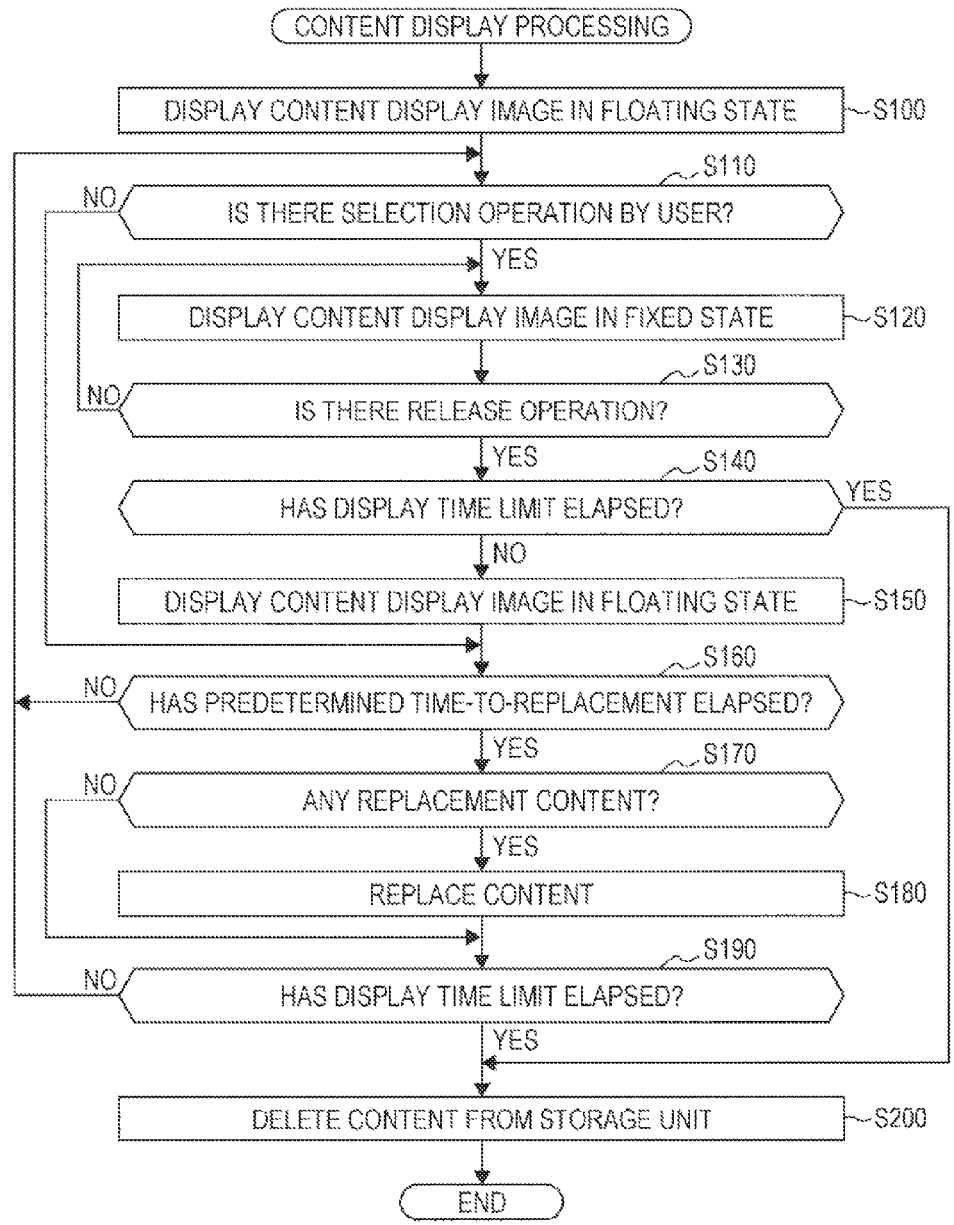
FIG. 5 is a flowchart of an example of processing by the information processing system.

In Step S60 shown in FIG. 4, the control unit 25 determines whether or not a predetermined end-of-cycle condition is satisfied. Here, the end-of-cycle condition is exemplified by the following conditions: the reference content is changed; a predetermined time has passed since the initiation of the processing of Step S50; or the number of content stored in the storage unit 24 becomes less than a predetermined number. When determining that the end-of-cycle condition is satisfied, the control unit 25 terminates the processing shown in FIG. 4 and newly starts the processing of Step S10. When determining that the end-of-cycle condition is not satisfied, the control unit 25 returns to Step S50.

As described above, the information processing system 10 moves the content display image within the display area 21a. Therefore, a user can conduct a search of content by searching content display images for a desired content display image. In other words, a user can conduct a search of content by only searching content display images for a desired content display image. Therefore, a user can easily search for content on a network. Furthermore, a user can perform such processing as bookmark registration, save and delete with respect to the content by just performing various selection operations with respect to the content display image.

Moreover, the information processing system 10 determines a display format of the content display image based on the meta-information of the content. Therefore, a user can estimate the details of the meta-information of the content based on the display format of the content display image.

More specifically, the information processing system 10 determines the size of the content display image and the migration speed of the content display image as the display format of the content display image. Therefore, a user can estimate the details of the meta-information of the content based on the size and the migration speed of the content display image.

Here, the meta-information of the content includes the preference of a user for the content, the rating of the content and the display time limit. Therefore, a user can estimate the preference of a user, the rating and the display time limit based on the display format of the content display image.

Furthermore, the information processing system 10 sets the preference of a user for content based on the number of times the content display image is selected by the user. Therefore, a user can control the preference of the user for content just by selecting the content display image.

Moreover, the information processing system 10 displays the content display image within the migration image. Therefore, a user can easily recognize that the content display image is in motion. In addition, the information processing system 10 can give visual spice to the user.

Furthermore, during the migration of the content display image, the information processing system 10 replaces the content display image by another content display image. Therefore, a user can watch a large number of content display images. In addition, the user is more likely to find desired content.

Moreover, the information processing system 10 changes the state of the content display image to the fixed state based on an input operation (selection operation) by a user. As a result, the user can watch a desired content display image in a relaxed way.

Furthermore, the information processing system 10 deletes the content display image when the display time limit has elapsed. Therefore, a user can eliminate a content display image that does not appeal to the user, by leaving such a content display image.

While a preferred embodiment of the present disclosure has been described in detail above with reference to the attached drawings, a technical scope of the present disclosure is not limited to the embodiment. It is obvious that a person ordinarily skilled in the art of the present disclosure can come up with a variety of modification examples and revised examples without departing from the scope of the technical idea as described in the claims, and it will be understood that those examples are obviously within the technical scope of the present disclosure.

In addition, the following configurations are included in the technical scope of the present disclosure.

(1). An information processing device comprising: a control unit to control movement of an image related to content within a predetermined area of a display, and a display format of the image based on at least one of a category of the content to which the image is related or meta-information corresponding to the content to which the image is related.

(2). The information processing device of (1), wherein the meta-information includes at least one of preference of a user for the content, a rating of the content or a time limit for display of the content.

(3). The information processing device of (2), wherein the preference is based on a number of times the user uses a predetermined content.

(4). The information processing device of (1), wherein the control unit displays a list of processing operations with respect to the image, in response to an input operation with respect to the image when the image is in a fixed state.

(5). The information processing device of (4), wherein one of the processing operations is selectable by an input operation at a location of the display indicating the one of the processing operations.

(6). The information processing device of (1), wherein the control unit controls the movement of the image to set the image at a fixed position on the display.

(7). The information processing device of (6), wherein the fixed position is at a location of the display at which an input operation with respect to the image is performed.

(8). The information processing device of (6), wherein the control unit controls display of another image near the image when the image is set at the fixed position.

(9). The information processing device of (1), wherein the content and the meta-information are from a server.

(10). The information processing device of (1), wherein the control unit controls replacement of content displayed within the image.

(11). The information processing device of (10), wherein the content is replaced with replacement content and the control unit controls displays of the replacement content within the image based on meta-information corresponding to the replacement content.

(12). The information processing device of (1), wherein the control unit controls whether the image is displayed based on a time limit for display of the content indicated by the meta-information.

(13). The information processing device of (1), wherein the control unit controls the movement of the image based on whether a release operation is performed when the image is in a fixed state.

(14). The information processing device of (13), wherein the release operation is an input operation performed with respect to a predetermined second image displayed near the image when the image is in a fixed state.

(15). The information processing device of (1), wherein the control unit controls the movement of the image based on a predetermined route and a predetermined speed determined from the meta-information.

(16). The information processing device of (15), wherein the predetermined route and the predetermined speed are determined based on a time remaining of a time limit for display of the content when a setting of the image on the display is changed from a fixed state to a moving state.

(17). The information processing device of (15), wherein the predetermined route and the predetermined speed are determined after the image is moved based on an operation by a user when a setting of the image on the display is a fixed state.

(18). The information processing device of claim 1, wherein the display format includes size of the image.

(19). An information processing method comprising: controlling, by a processor, movement of an image related to content within a predetermined area of a display, and a display format of the image based on at least one of a category of the content to which the image is related or meta-information corresponding to the content to which the image is related.

(20). A non-transitory storage medium recorded with a program executable by a computer, the program comprising: controlling movement of an image related to content within a predetermined area of a display, and a display format of the image based on at least one of a category of the content to which the image is related or meta-information corresponding to the content to which the image is related.

The invention claimed is:

1. An information processing device comprising:
a control unit to control movement of an image related to content within a predetermined area of a display, whether the image is displayed, and a display format of the image based on at meta-information corresponding to the content to which the image is related, wherein the control unit controls replacement of content displayed within the image, and wherein the content is replaced with replacement content and the control unit controls displays of the replacement content within the image based on meta-information corresponding to the replacement content,
the meta-information includes preference of a user for the content and a rating of the content, in which the preference of the user is based on a number of times the user has used the content and in which the display format includes size of the image such that the size of the image is based on the number of times the user has used the content and the rating of the content.

2. The information processing device of claim 1, wherein the meta-information includes a time limit for display of the content.

3. The information processing device of claim 1, wherein the control unit displays a list of processing operations with respect to the image, in response to an input operation with respect to the image when the image is in a fixed state.

4. The information processing device of claim 3, wherein one of the processing operations is selectable by an input operation at a location of the display indicating the one of the processing operations.

5. The information processing device of claim 1, wherein the control unit controls the movement of the image to set the image at a fixed position on the display.

6. The information processing device of claim 5, wherein the fixed position is at a location of the display at which an input operation with respect to the image is performed.

7. The information processing device of claim 5, wherein the control unit controls display of another image near the image when the image is set at the fixed position.

8. The information processing device of claim 1, wherein the content and the meta-information are from a server.

9. The information processing device of claim 1, wherein the control unit controls whether the image is displayed based on a time limit for display of the content indicated by the meta-information.

10. The information processing device of claim 1, wherein the control unit controls the movement of the image based on whether a release operation is performed when the image is in a fixed state.

11. The information processing device of claim 10, wherein the release operation is an input operation performed with respect to a predetermined second image displayed near the image when the image is in a fixed state.

12. The information processing device of claim 1, wherein the control unit controls the movement of the image based on a predetermined route and a predetermined speed determined from the meta-information.

13. The information processing device of claim 12, wherein the predetermined route and the predetermined speed are determined based on a time remaining of a time limit for display of the content when a setting of the image on the display is changed from a fixed state to a moving state.

14. The information processing device of claim 12, wherein the predetermined route and the predetermined speed are determined after the image is moved based on an operation by a user when a setting of the image on the display is a fixed state.

15. An information processing method comprising:
controlling, by a processor, movement of an image related to content within a predetermined area of a display, whether the image is displayed, and a display format of the image based on information corresponding to the content to which the image is related, wherein the controlling controls replacement of content displayed within the image, and wherein the content is replaced with replacement content and the controlling controls displays of the replacement content within the image based on meta-information corresponding to the replacement content,
the meta-information includes preference of a user for the content and a rating of the content, in which the preference of the user is based on a number of times the user has used the content and in which the display format includes size of the image such that the size of the image is based on the number of times the user has used the content and the rating of the content.

16. A non-transitory storage medium recorded with a program executable by a computer, the program comprising:
controlling movement of an image related to content within a predetermined area of a display, whether the image is displayed, and a display format of the image based on meta-information corresponding to the content to which the image is related, wherein the controlling controls replacement of content displayed within the image, and wherein the content is replaced with replacement content and the controlling controls displays of the replacement content within the image based on meta-information corresponding to the replacement content,
the meta-information includes preference of a user for the content and a rating of the content, in which the preference of the user is based on a number of times the user has used the content and in which the display format includes size of the image such that the size of the image is based on the number of times the user has used the content and the rating of the content.

* * * * *